United States Patent Office 3,419,499
Patented Dec. 31, 1968

3,419,499
DEICER COMPOSITIONS
George Douglas Nelson, St. Louis, Mo., assignor to Monsanto Company, St. Louis, Mo., a corporation of Delaware
No Drawing. Filed May 6, 1966, Ser. No. 548,052
14 Claims. (Cl. 252—70)

ABSTRACT OF THE DISCLOSURE

A particulate solid deicer composition is disclosed comprising tetrapotassium pyrophosphate and a water-soluble nitrogenous organic compound having a freezing point below 30° F. and represented by the formula

wherein $R_1$ and $R_2$ are each selected from the group consisting of hydrogen and lower alkyl and $R_3$ is selected from the group consisting of hydrogen, lower alkyl and

wherein R is selected from the group consisting of hydrogen and lower alkyl; the weight ratio of tetrapotassium pyrophosphate to said organic compound being at least about 3.5:1.

---

This invention relates to particulate solid compositions effective for removing ice from surfaces. More particularly this invention relates to compositions useful in melting ice and snow from airport runways, streets, roadways, and the like and to methods for using such compositions.

It is known to use solid chemicals to remove ice from surfaces such as roadways, highways, and the like. However, none of the compositions heretofore known have many of the characteristics necessary to make them useful in all deicing uses, therefore most of the solid deicers in use today are limited in their applications. A deicer composition must melt ice at a rapid rate under relatively low temperature conditions even at relatively low application levels. In most instances, solid deicers are preferred over liquid compositions since they will remain on sloping surfaces. Additionally, the compositions should be water soluble to prevent a subsequent removal problem. Furthermore, the deicer has to demonstrate low corrosivity on ferrous metals and aluminum for some uses such as airport runway deicing. It is also preferred that deicers be free of herbicidal activity particularly for use in home driveways and the like. Furthermore, a deicer composition should be nontoxic in order to prevent injury to those applying the composition or to others who may come into contact with it before and after application. Such solid deicer compositions must remain free flowing without caking under conditions of prolonged storage.

Since none of the heretofore known compositions which have been used in deicing applications exhibit all of the foregoing suitable properties, it is believed, a nonherbicidal solid composition which has a suitable ice melting rate under low temperature conditions, at relatively low application levels, and which can be inhibited to exhibit a relatively low corrosivity towards ferrous metals and aluminum would be an advancement in the art.

In accordance with this invention, it has been found that compositions comprising tetrapotassium pyrophosphate and a nitrogenous organic compound having a freezing point of below 30° F. and selected from the group consisting of alkyl amines, alkyl amides, and mixtures thereof wherein the weight ratio of tetrapotassium pyrophosphate to the nitrogenous organic compound is at least about 3.5:1, demonstrate effective ice removal even at low temperatures and low application levels. Also, formulations containing the foregoing compounds have higher melting rates than either of its components alone. Additionally, when the ratio of tetrapotassium pyrophosphate to the liquid organic nitrogenous compound is at least about 3.5:1 a particulate solid composition is obtained.

The compositions of this invention are water soluble and can incorporate small amounts of corrosion inhibitors to thereby yield a composition which is relatively noncorrosive towards ferrous metals and aluminum. Quite unexpectedly, it has been found that by incorporating sodium metasilicate in proper amounts into the composition of this invention a product is produced which has extremely low corrosivity towards steel and aluminum thereby furnishing a composition which is particularly well suited for airport runway deicing. Furthermore, the compositions of this invention are relatively nontoxic and promote the growth of most plants and grass, an improvement over some of the well-known deicer compositions such as sodium chloride and calcium chloride which show herbicidal activity.

It is also believed surprising that compositions containing tetrapotassium pyrophosphate and the organic nitrogenous compounds as specified in detail hereinafter give effective ice melting rates since several of the alkali metal phosphates were found to be unsuitable. For example, other alkali metal phosphates such as dipotassium phosphate, potassium tripolyphosphate, monoammonium phosphate, diammonium phosphate, triammonium acid pyrophosphate, tetrasodium pyrophosphate, and monopotassium phosphate in combination with organic nitrogenous compounds useful in this invention have unsuitable melting rates. Also, compositions containing tripotassium orthophosphate and the organic nitrogenous compounds useful in this invention liberate potassium cyanide, a highly toxic compound, and in addition, tend to cake badly thereby rendering them unsuitable.

The water soluble organic nitrogenous compounds which are useful in the practice of this invention are those having a freezing point below 30° F. and selected from the group consisting of alkyl amines, alkyl amides, and mixtures thereof. It is preferred to use water soluble organic nitrogenous compounds which have a melting point below about 5° F. and a boiling point above about 120° F. These compounds have been found to give compositions which have somewhat higher melting rates at extremely low temperatures than the compounds which have higher melting points. It is an additional advantage to use the compounds having the foregoing lower melting point and higher boiling point because they can be easily uniformly distributed throughout the tetrapotassium pyrophosphate with ease since they are liquid at most of the temperatures that would be employed in manufacturing the deicer compositions. However, it is not essential to have compounds which have the lower freezing points (below about 5° F.) and higher boiling points (above 120° F.) but merely aids in the preparation of the deicer compositions and yields a preferred embodiment of this invention. Additionally, it has been found that it is preferred to use the lower alkyl amines, lower alkyl amides, and mixtures thereof having a freezing point below 30° F. and which can be represented by the formula

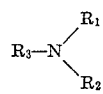

wherein $R_1$ and $R_2$ are each selected from the group consisting of hydrogen and lower alkyl and $R_3$ is selected from the group consisting of hydrogen, lower alkyl and

wherein R is selected from the group consisting of hydrogen and lower alkyl. As used herein, "lower alkyl" contains from 1 to 4 carbon atoms. It is further preferred that relatively low molecular weight compounds represented by the foregoing formula be used, that is, those which contain from 1 to about 9 carbon atoms.

The alkyl amines illustrative of those useful in this invention include: ethyl amine, n-propyl amine, butyl dimethyl amine, dibutyl amine, trimethyl amine, dipropyl amine, isopropyl amine, methyl butyl amine, methyl propyl amine, ethyl methyl amine, and ethyl dimethyl amine.

Nonlimiting examples of useful alkyl amides include formamide, dimethyl formamide, dimethyl acetamide, diethyl formamide, methyl propanamide, dimethyl propanamide, ethyl acetamide, methyl acetamide, methyl formamide, ethyl formamide, diethyl propanamide, dimethylbutyramide, diethylbutyramide, and dimethylpentamide.

Although any of the water soluble organic nitrogenous compounds having a freezing point below about 30° F. and which contain from 1 to about 12 carbon atoms can be used in the practice of this invention, it is preferred to utilize the lower alkyl amines and amides which have from 1 to about 9 carbon atoms because of their relatively inexpensiveness. Of these, formamide, dimethyl formamide and triethylamine are especially preferred. Of these especially preferred compounds, formamide is particularly preferred.

Although it is not necessary in some instances to use a corrosion inhibitor, any corrosion inhibitor which is useful in inhibiting phosphate corrosion towards aluminum at relatively high pH ranges, that is, from about 8 to about 12, can be used to impart to the composition a relatively low corrosivity towards aluminum. It has been found however that only a relatively few compounds, such as sodium metasilicate, sodium fluorosilicate, and mixtures thereof, reduce the corrosion rate on aluminum by any major amount. It is further preferred, although not essential, since the corrosion inhibitors are used at relatively minor amounts, that the corrosion inhibitor be water soluble. It is, therefore, generally preferred to use sodium metasilicate in the practice of this invention. By "relatively low corrosivity towards aluminum" as used herein, it is meant that a 10% by weight aqueous solution at 25° C. of the composition will give less than about 50 mils corrosion per year upon aluminum in a standard corrosion test, the details of which are given in Example 4. It is generally preferred for some applications that a deicer composition have even lower corrosivity, that is, below about 10 mils per year. It has been found that compositions of this invention containing sodium metasilicate are especially suitable when these extremely low corrosion rates are desired for uses such as airport runway deicing. Since the amount of corrosion inhibitor used is small, it is generally preferred to incorporate sodium metasilicate so that the deicer can be employed in all uses; therefore, a preferred embodiment of this invention is a composition containing sodium metasilicate and having the extremely low corrosivity rate of less than 10 mils per year on aluminum, measured as specified above.

It has been found that as little as 0.1% by weight based upon the tetrapotassium pyrophosphate of the beforementioned corrosion inhibitors can be used to give a reduction in the corrosivity towards aluminum. In most instances, it is preferred to use from about 0.5% to about 2.0% by weight based upon the pyrophosphate although higher amounts, even as high as 10% by weight or even higher can be used. As can be seen from Example 4 as little as 1% by weight of sodium metasilicate is surprisingly effective as an aluminum corrosion inhibitor. Therefore, it is the preferred inhibitor. Use of amounts larger than about 2% of the corrosion inhibitors have not been found to reduce the corrosion an appreciable amount to warrant the higher usage and since it tends to lessen the effectiveness of the deicer on a weight basis, such higher amounts of corrosion inhibitor are not recommended.

As mentioned previously, it is necessary in order to obtain a particulate solid composition to have the weight ratio of tetrapotassium pyrophosphate to the nitrogenous organic compounds of a least about 3.5:1. Compositions having less tetrapotassium pyrophosphate in relation to the organic compound do not form particulate solids upon mixing the components but instead form semi-solid, gummy materials which harden to form a solid, hard, brittle material which have to be ground to form particulate solids.

Lesser amounts of the organic compounds can be used in effective deicing compositions such as compositions with weight ratios of tetrapotassium pyrophosphate to the organic compound of from 8:1 to 10:1 and as high as 20:1 and even higher such as 50:1 yield products having a discernible increased melting rate when compared to tetrapotassium pyrophosphate alone. It has been found that compositions containing from about 4:1 to about 10:1 are preferred for the optimum handling of material, ice melting rate, and ease of manufacturing. Those compositions containing a weight ratio of tetrapotassium pyrophosphate to the organic compound of from about 4:1 to about 6:1 are especially preferred, with compositions containing a weight ratio of about 5:1 being particularly easy to prepare.

The application level of the deicer composition will depend upon many variables such as weather conditions, thickness of the ice, the degree of melting that is desired and the like. For example, it may be desirable in some instances to lightly coat a surface before a freezing rain begins with a deicer to prevent adherence of the ice to the surface. If the freezing rain is expected to be of short duration, a low level of application, such as 0.05 pound per square foot, can be satisfactory. In other applications where it is desired to remove a heavier layer of ice and/or the temperature is relatively cold such as −10° F. and/or high rates of ice melting are desired, such as 70% in an hour, heavier application levels such as 0.5 pound per square foot can be used. In most instances at temperatures of from 5° to 15° F., an application level of from about 0.15 to about 0.40 pound per square foot gives satisfactory ice removal where the ice is less than about ¼ inch thick.

It has also been discovered that an aqueous solution of the compositions of this invention are useful in removing snow from surfaces. In using aqueous solutions for snow removal, the compositions should contain a water soluble corrosion inhibitor, such as sodium metasilicate. Snow melting by the solid compositions can be achieved; however, the individual particles tend to melt through the snow to the surface underneath; therefore, high application levels are necessary. By dissolving the deicer in water the resulting solution can be uniformly sprayed over snow and effectively remove the snow from the surface. For example, a suitable aqueous solution contains from about 40% to about 70% by weight of deicer composition although solutions containing from about 10% to about 75% can be used, if desired. As can be appreciated, the higher the concentration of deicer composition in the aqueous solution, the higher the snow melting rate. Also the higher the accumulation of snow, the higher the application level of solution.

A suitable method for producing the compositions of this invention is to feed, either continuously or batchwise, an appropriate amount of tetrapotassium pyrophosphate into a ribbon mixer, subsequently distribute the corrosion inhibitor throughout the pyrophosphate, then add the appropriate amount of organic compound in the form of a spray or a fine stream to insure intimate contact with the other ingredients. A conventional mill can be used to break up any lumps which form if desired; or a conventional screen can be used to remove any material which has a particle size larger than desired. The bulk density of the compositions of this invention will generally run from about 50 to about 70 lbs. per cubic foot. It has been found that for runway deicing the particles which pass through a U.S. Standard 8 mesh screen are preferred. However, for other uses, larger or smaller particle sizes may be desired. To prevent dusting, it is generally recommended that material having a particle size greater than that which will pass through a U.S. Standard 200 mesh screen be used.

The following specific examples are given to more fully explain this invention. All parts and proportions and percentages are by weight unless otherwise indicated.

EXAMPLE 1

A simple test is used to determine the melting rate of a deicer composition. A uniform layer of ice of a constant thickness is formed over a test surface of constant area by freezing a known amount of water. After the composition to be tested has reached the test temperature, a known amount of the composition is spread uniformly over the ice on the test surface at a known application level. The ice and composition to be tested are allowed to remain at the test temperature for one hour, then the amount of liquid is measured. Since the thickness of ice is the same in each test, the melting rate can be expressed as follows:

$$\frac{\text{Weight of liquid after one hour}}{\text{Weight of original ice}} \times 100 = \text{Melting rate}$$

Using the foregoing procedure, the melting rates are run on various compositions at +2° F. and −10° F. at an application level of 0.25 pound per square foot. The compositions tested are given below.

Composition A: Tetrapotassium pyrophosphate (TKPP)
Composition B: Formamide
Composition C:
    80% TKPP
    20% formamide
Composition D:
    83.3% TKPP
    16.7% formamide
Composition E:
    90% TKPP
    10% formamide Melting rates of these compositions are shown in Table I.

TABLE I

| Composition | Melting Rate, percent/hour | |
|---|---|---|
| | −10° F. | +2° F. |
| Composition A | 27 | 40 |
| Composition B | 0 | 0 |
| Composition C | 43 | 48 |
| Composition D | 43 | 48 |
| Composition E | 40 | 42 |

Results of the above test clearly demonstrate the synergistic effect of the compositions of this invention. For example, in all three mixtures, that is, mixtures containing weight ratios of TKPP to formamide of 4:1, 5:1 and 9:1, a considerably higher melting rate is achieved than with either TKPP or formamide.

In similar tests the melting rate of methanol, ethylene glycol, sodium chloride, and urea are measured. Results of these tests are given as follows:

| Composition | Melting Rate, percent/hour | |
|---|---|---|
| | −10° F. | +2° F. |
| Methanol | 14 | 28 |
| Ethylene Glycol | 26 | 20 |
| Sodium Chloride | 0 | 38 |
| Urea | 0 | 0 |

The results of these tests show that the compositions of this invention are superior to the well-known and widely used solid chemical deicers, sodium chloride and urea. Furthermore, the compositions of this invention are superior to the well-known liquid deicers methanol and ethylene glycol. Similar results, that is, a synergistic effect, are experienced when dimethyl formamide, dimethylacetamide, triethylamine and tributylamine are substituted for formamide in the compositions C, D, and E of this example. Under similar conditions, however, triethylamine and tributylamine when used alone gave a melting rate of 0% per hour.

EXAMPLE 2

About 250 parts of solid tetrapotassium pyrophosphate are charged into a conventional ribbon blender. Essentially all tetrapotassium pyrophosphate charged has a particle size smaller than 5,000 microns and about 90% larger than about 100 microns. About 3 parts of sodium metasilicate are added and the mixture is blended for about one minute. About 50 parts of formamide are sprayed uniformly over the blender contents in about 2 to 4 minutes. The blending operation continues for about an additional two minutes and the material is screened using a conventional screen. The maximum particle size of the product is essentially the same as the original tetrapotassium pyrophosphate with the minimum particle size slightly larger in particle size than the original tetrapotassium pyrophosphate, that is, essentially all of the product has a particle size larger than about 300 microns. The product is free flowing and shows no tendency to cake.

As mentioned previously, the application level of a deicer is important as well as the melting rate, that is a relatively high melting rate at a relatively low application level is desired. A melting coefficient is calculated as follows:

$$\frac{\text{Weight of deicer}}{\text{Weight of ice melted per hour}} = \text{Melting coefficient}$$

Using the foregoing procedure, the melting rate and melting coefficient of the product of this example is measured at two temperatures (−10° F. and +2° F.) and at three application levels (0.13 pound/sq. ft., 0.25 pound/ sq. ft., and 0.37 pound/sq. ft.). Melting rates and melting coefficients are tabulated below.

TABLE II

| Application level (pounds/ sq. ft.) | Melting Rate, percent/hour | | Melting coefficient | |
|---|---|---|---|---|
| | −10° F. | +2° F. | −10° F. | +2° F. |
| .13 | 20 | 24 | .77 | .65 |
| .25 | 43 | 48 | .70 | .63 |
| .37 | 66 | 82 | .68 | .56 |

Other mixtures prepared in a substantially similar manner except tripotassium orthophosphate, dipotassium phosphate, potassium tripolyphosphate, monoammonium phosphate, diammonium phosphate, triammonium hydrogen, monosodium orthophosphate, tetrasodium pyrophosphate, and monopotassium phosphate are subsituted for the tetrapotassium pyrophosphate in the composition of this invention produce products having unsuitable lower melting rates and unsuitable melting coefficients. For example, at the 0.25 pound/sq. ft. application level and at 2° F., no melting is observed with a mixture of similar compositions except the following phosphates were used in place of tetrapotassium pyrophosphate: monoammonium phosphate, diammonium phosphate, tetrammonium pyrophosphate, disodium phosphate, tetrasodium pyrophosphate, monopotassium phosphate.

A formulation containing tripotassium orthophosphate and formamide (unsuitable for practical use because of the toxicity and caking problems heretofore mentioned) is considerably less efficient than the composition of this invention particularly at the more severe temperature conditions. For example, two compositions are prepared in a similar manner to that listed above only a 4:1 weight ratio of phosphate to formamide ratio is used in place of the 5:1 weight ratio previously mentioned. Using similar tests the material containing tetrapotassium pyrophosphate at a 0.25 lbs./ft. application level melts 43% of the ice in one hour at −10° F. while the same application level of a mixture containing tripotassium orthophosphate and formamide at the same temperature melts only 22% of the ice in one hour. Even at higher application levels (0.35 lbs./sq. ft.) the difference is more apparent. The composition of this invention melts 66% of the ice in one hour while the composition containing tripotassium orthophosphate melts only 27% of the ice in the same time.

EXAMPLE 3

Other compositions are prepared as in Example 1 except that other liquid organic nitrogenous compounds were substituted for the formamide in the composition of Example 1 to give compositions having a 5:1 weight ratio of tetrapotassium pyrophosphate to organic compound. Similar ice melting tests are conducted at about 0.13 and 0.25 pound per square foot application levels at +2° F. Results of these tests are shown in Table III.

TABLE III

| Organic nitrogenous compound | Melting rates, percent/hour | |
|---|---|---|
| | 0.13 | 0.25 |
| Dimethylformamide | 20 | 44 |
| Dimethylacetamide | 22 | 46 |
| Triethylamine | 17 | 42 |

An additional composition is prepared as above only using tributylamine as the organic nitrogenous compound. A melting rate of 44% of the ice in one hour is achieved at =2° F. at a ¼ pound per square foot application level. Substantially similar melting rates are achieved when other alkyl amines and amides are substituted for tributylamine in the above composition in amounts so as to keep a 5:1 weight ratio of tetrapotassium pyrophosphate to organic nitrogenous compound. For example, substantially similar results are achieved when dimethyl amide, n-propyl amine, methyl amine, n-pentylamine, trimethylamine, dimethyl ethylamine, dimethyl acetamide, diethylformamide dimethylpropanamide, dimethylpentamide, and dimethylbutyramide are substituted for tributylamine to give a composition containing about 5:1 weight ratio of tetrapotassium pyrophosphate to organic nitrogenous compound.

EXAMPLE 4

As was previously mentioned, a deicer composition in order to achieve acceptance in some uses, such as runway deicing, must have low corrosivity towards ferrous metals and aluminum.

Corrosion rate of various compositions are tested by preparing 10 weight percent aqueous solutions at room temperature and submerging standard corrosion coupons at 1010, 4340 steel and 7075 and 7079 aluminum for a known time period. After the time period, the penetration of corrosion is measured and expressed in mils per year. Following this procedure, various compositions are tested and the results of these tests are shown in the following table.

TABLE IV.—CORROSION RATES
[10% Aqueous Solutions of Samples at Room Temperature]

| Composition | Time of Test | Corrosion Rates (mils/yr.) | | | |
|---|---|---|---|---|---|
| | | Steel | | Aluminum | |
| | | 1010 | 4340 | 7075 | 7079T6 |
| Samples: | | | | | |
| 1 ............... 100% TKPP | 100 | 0.24 | 0.00 | 150 | 183 |
| 2 ............... 5 parts TKPP 1 part formamide | 96 | | | | 190 |
| 3 ............... TKPP, 1% Na₂SiO₃ | 210 | | | | 7.1 |
| 4 ............... 5 parts TKPP, 1 part formamide, 1% Na₂SiO₃ | 168 | 0.0 | 0.0 | 0.0 | 0.0 |
| 5 ............... 4 parts TKPP, 1 part formamide | 100 | 0.16 | 0.0 | 72.5 | 199.0 |
| 6 ............... 4 parts TKPP, 1 part formamide, 1% Na₂SiF₆ | 216 | 0.12 | 0.03 | 11.8 | 26.3 |
| 7 ............... TKPP, 1% Na₂SiF₆ | 100 | 0.19 | 0.0 | 99.6 | 128 |
| 8 ............... 5 parts TKPP, 1 part formamide, 1% Na₂S₂O₃ | 96 | | | | 44.5 |
| 9 ............... 5 parts TKPP, 1 part formamide, 1% NaNO₃ | 96 | | | | 242 |

Similar test results are achieved with other deicer compositions of this invention when an equivalent amount of other amides and amines are substituted for formamide in a composition of the above example. For example, compositions containing a 5:1 and 4:1 weight ratio of tetrapotassium pyrophosphate to organic nitrogenous compounds including dimethyl amide, dimethyl formamide, dimethyl propionyl amide, diethyl formamide, dibutylbutyramide, triethyl amine, and tributyl amine yield corrosion levels under 50 mils per year upon steel and aluminum.

The above test results also indicate that sodium metasilicate is surprisingly effective in the protection of aluminum against the corrosiveness of aqueous solutions of this invention. As can be seen from the above data, similar compounds are not as effective. Sodium nitrate, for example, is completely ineffective while sodium fluorosilicate is much less effective. The effectiveness of sodium metasilicate cannot be predicted from the test samples of tetrapotassium pyrophosphate and sodium metasilicate alone. While the corrosion rate towards aluminum of an aqueous solution of tetrapotassium pyrophosphate is appreciably reduced by sodium metasilicate, it is not as low as the corrosion rate of the compositions of this invention to which sodium metasilicate has been added. This is surprising in view of the fact that the uninhibited compositions of this invention have a higher corrosion rate than tetrapotassium pyrophosphate alone.

It is also to be noted that the corrosivity towards ferrous metals of the uninhibited compositions of this invention are acceptable for most uses, however, if aqueous solutions thereof come into contact with aluminum a corrosion problem may exist. As is clearly shown above, this problem can be overcome by adding small amounts of sodium fluorosilicate, sodium thiosulfate, sodium metasilicate or mixtures thereof and can be essentially eliminated by using sodium metasilicate.

What is claimed is:
1. A particulate solid deicer composition consisting essentially of tetrapotassium pyrophosphate and a water-soluble nitrogenous organic compound having a freezing point below 30° F. and represented by the formula

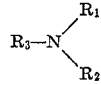

wherein $R_1$ and $R_2$ are each selected from the group consisting of hydrogen and lower alkyl and $R_3$ is selected from the group consisting of hydrogen, lower alkyl and

wherein R is selected from the group consisting of hydrogen and lower alkyl; the weight ratio of tetrapotassium pyrophosphate to said organic compound being from 3.5:1 to 50:1.

2. A composition according to claim 1 wherein the total number of carbon atoms in said water-soluble nitrogenous organic compound is from 1 to about 9.

3. A composition according to claim 2 wherein a corrosion inhibitor selected from the group consisting of sodium fluorosilicate, sodium silicate, and mixtures thereof is present in amounts of at least 0.1% by weight based upon said tetrapotassium pyrophosphate.

4. A composition according to claim 3 wherein said corrosion inhibitor is sodium metasilicate.

5. A composition according to claim 4 wherein $R_3$ is

and R is selected from the group consisting of hydrogen and lower alkyl.

6. A composition according to claim 5 wherein the weight ratio of tetrapotassium pyrophosphate to said water soluble organic compound is from 4:1 to 10:1.

7. A composition according to claim 6 wherein said water-soluble organic compound is formamide.

8. A composition according to claim 6 wherein said water-soluble organic compound is dimethylformamide.

9. A method for melting ice comprising adding to said ice a particulate solid deicer composition comprising tetrapotassium pyrophosphate and a water-soluble nitrogenous organic compound having a freezing point below 30° F. and represented by the formula

wherein $R_1$ and $R_2$ are each selected from the group consisting of hydrogen and lower alkyl and $R_3$ is selected from the group consisting of hydrogen, lower alkyl and

wherein R is selected from the group consisting of hydrogen and lower alkyl.

10. A method according to claim 9 wherein a corrosion inhibitor selected from the group consisting of sodium metasilicate, sodium fluorosilicate, and mixtures thereof is present in amounts of at least about 0.1% by weight based upon said tetrapotassium pyrophosphate.

11. A method according to claim 10 wherein said organic compound is formamide.

12. A method according to claim 10 wherein said organic compound is dimethyl formamide.

13. A method for melting snow comprising adding to said snow an aqueous solution containing dissolved therein a deicer composition consisting essentially of tetrapotassium pyrophosphate, sodium metasilicate, and a water-soluble nitrogenous organic compound having a freezing point below 30° F. and represented by the formula

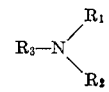

wherein $R_1$ and $R_2$ are each selected from the group consisting of hydrogen and lower alkyl and $R_3$ is selected from the group consisting of hydrogen, lower alkyl and

wherein R is selected from the group consisting of hydrogen and lower alkyl; the weight ratio of tetrapotassium pyrophosphate to said organic compound being from 3.5:1 to 50:1 and said sodium metasilicate being present in amounts of at least about 0.10% by weight based upon said tetrapotassium pyrophosphate.

14. A method according to claim 13 wherein said organic compound is formamide.

References Cited

UNITED STATES PATENTS 3,234,144   3/1966   Morehouse _____ 252—389

OTHER REFERENCES

Harris et al.: Chemical Means for Prevention of Accumulation of Ice, Snow, and Slush on Runways, Monsanto Research Corporation, March 1965, pp. 11, and A-1.

LEON D. ROSDOL, *Primary Examiner.*

S. D. SCHWARTZ, *Assistant Examiner.*

U.S. Cl. X.R.

252—381.

PO-1050
(5/69)

UNITED STATES PATENT OFFICE
CERTIFICATE OF CORRECTION

Patent No. 3,419,499    Dated December 31, 1968

Inventor(s) George Douglas Nelson

It is certified that error appears in the above-identified patent and that said Letters Patent are hereby corrected as shown below:

Column 7, line 52, after "at" first instance, change the equal sign to a plus sign so that it reads -- at +2° F. --; Column 10, line 35, under REFERENCES CITED, change the second s of numbers "3/1966" to -- 2/1966 --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents